United States Patent
Fan et al.

(10) Patent No.: US 9,741,130 B2
(45) Date of Patent: Aug. 22, 2017

(54) METHOD AND APPARATUS FOR DETECTING OBJECT

(71) Applicants: Shengyin Fan, Beijing (CN); Xin Wang, Beijing (CN)

(72) Inventors: Shengyin Fan, Beijing (CN); Xin Wang, Beijing (CN)

(73) Assignee: RICOH COMPANY, LTD., Tokyo (JP)

(*) Notice: Subject to any disclaimer, the term of this patent is extended or adjusted under 35 U.S.C. 154(b) by 204 days.

(21) Appl. No.: 14/133,895

(22) Filed: Dec. 19, 2013

(65) Prior Publication Data

US 2014/0177915 A1    Jun. 26, 2014

(30) Foreign Application Priority Data

Dec. 26, 2012   (CN) .......................... 2012 1 0574632

(51) Int. Cl.
| | |
|---|---|
| G06K 9/00 | (2006.01) |
| G06T 7/20 | (2017.01) |
| G06T 7/73 | (2017.01) |
| G06T 7/593 | (2017.01) |
| G06T 7/11 | (2017.01) |
| G06T 7/174 | (2017.01) |

(Continued)

(52) U.S. Cl.
CPC .............. *G06T 7/204* (2013.01); *G06T 7/11* (2017.01); *G06T 7/174* (2017.01); *G06T 7/194* (2017.01);

(Continued)

(58) Field of Classification Search
CPC . G06T 2207/10012; G06T 2207/10021; G06T 7/0075; G06T 17/00;

(Continued)

(56) References Cited

U.S. PATENT DOCUMENTS

| | | | |
|---|---|---|---|
| 5,202,928 A | 4/1993 | Tomita et al. | |
| 7,003,136 B1 * | 2/2006 | Harville | 382/103 |

(Continued)

FOREIGN PATENT DOCUMENTS

CN   201210292660   *   2/2014

OTHER PUBLICATIONS

Harville et al., Stereo person tracking with adaptive plan-view templates of height and occupancy statistics, 2004, Image and Vision Computing 22 (2004), pp. 127-142.*

(Continued)

*Primary Examiner* — Vu Le
*Assistant Examiner* — Guillermo Rivera-Martinez
(74) *Attorney, Agent, or Firm* — Oblon, McClelland, Maier & Neustadt, L.L.P.

(57) ABSTRACT

A method and an apparatus for detecting an object are disclosed. The method comprises the steps of obtaining a plurality of depth images of the object; extracting foregrounds; fusing the foregrounds in a unified three-dimensional world coordinate system; calculating an appearance two-dimensional histogram from the fused foreground by the following steps of dividing the foreground into vertical members and getting statistics of the numbers of foreground points in the vertical members so as to obtain the appearance two-dimensional histogram; determining an overlapping region and the number of overlaps based on the placement of stereo cameras; determining a detection parameter relating to a detection position based on the overlapping region and the number of overlaps; and detecting the object by the appearance two-dimensional histogram based on the determined detection parameter.

18 Claims, 13 Drawing Sheets

(51) Int. Cl.
*G06T 7/246* (2017.01)
*G06T 7/277* (2017.01)
*G06T 7/285* (2017.01)
*G06T 7/194* (2017.01)

(52) U.S. Cl.
CPC .............. *G06T 7/248* (2017.01); *G06T 7/277* (2017.01); *G06T 7/285* (2017.01); *G06T 7/593* (2017.01); *G06T 7/74* (2017.01); *G06T 2207/10021* (2013.01); *G06T 2207/10028* (2013.01); *G06T 2207/30196* (2013.01); *G06T 2207/30232* (2013.01); *G06T 2207/30241* (2013.01)

(58) Field of Classification Search
CPC . G06T 2207/20076; G06T 2207/20144; G06T 7/0048; G06K 9/00208
See application file for complete search history.

(56) References Cited

U.S. PATENT DOCUMENTS

| | | | |
|---|---|---|---|
| 7,742,620 | B2 | 6/2010 | Chen et al. |
| 7,929,017 | B2 | 4/2011 | Aggarwal et al. |
| 8,009,871 | B2 | 8/2011 | Rafii et al. |
| 2005/0094879 | A1* | 5/2005 | Harville ................... 382/209 |
| 2006/0028552 | A1* | 2/2006 | Aggarwal et al. ............ 348/169 |
| 2008/0101652 | A1* | 5/2008 | Zhao et al. ................... 382/103 |
| 2011/0141306 | A1* | 6/2011 | Nakano et al. ............ 348/222.1 |

OTHER PUBLICATIONS

Michael Harville, "Stereo Person Tracking with Adaptive Plan-View Templates of Height and Occupancy Statistics", Image and Vision Computing, vol. 22, 2004, pp. 127-142.

* cited by examiner

NUMBER OF POINTS IS SMALL

NUMBER OF POINTS IS LARGE 0   1   2

APPROXIMATE
HEIGHT

METHOD AND APPARATUS FOR DETECTING OBJECT

BACKGROUND OF THE INVENTION

1. Field of the Invention

The present invention generally relates to image processing, and specifically, a method and an apparatus for detecting an object based on stereo vision.

2. Description of the Related Art

A technology for detecting an object by using images collected by a stereo camera, such as patent document U.S. Pat. No. 8,009,871B for which the title of the invention is "METHOD AND SYSTEM TO SEGMENT DEPTH IMAGES AND TO DETECT SHAPES IN THREE-DIMENSIONALLY ACQUIRED DATA", patent document U.S. Pat. No. 5,202,928A for which the title of the invention is "SURFACE GENERATION METHOD FROM BOUNDARIES OF STEREO IMAGES", and an article "Stereo Person Tracking with Adaptive Plan-View Templates of Height and Occupancy Statistics" published by Michael Harville in 2003, has existed.

As an example of positioning or detection of a person, person positioning is the base of the technology for humans, and a service can be provided or pushed only after a person has been accurately positioned. The person positioning means that a person is detected, and position information of the person indoor or outdoor, namely, coordinate values of the person in a world coordinate system (x,y,z) is obtained.

The core of the person positioning technology based on the stereo vision is the technology of the person detection and tracking from a sequence of depth images or disparity maps. Now, it is still a challenging technical problem, mainly because the shape and appearance of a person largely varies and shielding problems frequently occur. In the indoor scene, the occurrence frequency of the shielding is higher since the background is complex and there are a lot of persons, thereby often leading to failure of the person detection and tracking. Meanwhile, the viewing angle of a single stereo camera is limited, and the measurement error increases with the increase of the distance. Therefore, a plurality of stereo cameras may be placed to increase the viewing angle of the system and the effective measurement range, and reduce the shielding problems.

SUMMARY OF THE INVENTION

As the consideration of the inventor, it is an important subject, how to detect a person more effectively, or to track and position a person more accurately by using depth/disparity information of a plurality of stereo cameras, and it may be solved by using a fusion technology. The fusion may be divided into three types according to a fusion object: the fusion of original data sets; the fusion of feature sets; and the fusion of result sets.

In scenes of a plurality of stereo cameras such as binocular cameras, the data amount of transmission over the network and the data amount of processing for fusing the original data sets, namely the fusion of pixel sets, is large, and the fusion cannot be applied to a real scene in real time.

In patent document U.S. Pat. No. 7,929,017B2, a method and an apparatus for the fusion of stereo cameras, multi-cameras, and RF and video are provided. In this method, tracking results of monocular cameras or stereo cameras, and results of RFID, positioning systems and biometric identification systems are fused. In this fusion technology, a conversion of sensor information is performed, after a rigorous uncertainty analysis to account for various sensor noises and ambiguities is performed. A space-time constraint is used to fuse different sensors using location and velocity information. A Bayes method is used of fusing various results in the method provided in this patent document, and the fusion targets are a tracked result and position information. In order to increase the stability, the space-time constraint is considered.

In patent document U.S. Pat. No. 7,742,620B2, a method of improving the detection result by time-domain and space-domain fusion is provided. The fusion object of this method is for the processing result of different sensors, the fusion of space-domain and the fusion of time-domain to be combined together, and a special threshold process is used.

Both of the above two patent documents use the fusion of the result sets. In general, since a lot of original information and features have been already lost from the result, the reliability of the result itself is uncertain, therefore the error rate of the fusion result is high.

The present invention is made in light of the above problems in the prior art.

It is one of objects of the present invention to provide a method and an apparatus for detecting an objet that has strong robustness for the object shielding and can accurately detect objects as much as possible.

According to an embodiment of the present invention, a method for detecting an object may comprise the steps of obtaining a plurality of depth images of the object by picking up the object by a plurality of stereo cameras; extracting from the depth images, foregrounds with an image coordinate system; fusing the foregrounds in a unified three-dimensional world coordinate system defined by rectangular coordinates of x, y and z directions, where the object stands on a x-z plane limited by the x and z axes; calculating an appearance two-dimensional histogram on the x-z plane from the foreground fused in the three-dimensional world coordinate system by the following steps of dividing the foreground fused in the three-dimensional world coordinate system into vertical members extending along the y direction and getting statistics of the numbers of foreground points in the vertical members so as to obtain the appearance two-dimensional histogram representing the numbers of the foreground points in the vertical members; determining an overlapping region of the corresponding depth images on the x-z plane and determining the number of overlaps, based on the placement of the stereo cameras; determining a detection parameter relating to a detection position, based on whether the detection position is located in the overlapping region or not and the corresponding number of overlaps; and detecting the object by the appearance two-dimensional histogram, based on the determined detection parameter.

According to another embodiment of the present invention, an apparatus for detecting an object may comprise a plural depth images obtainment unit configured to obtain a plurality of depth images of the object by picking up the object by a plurality of stereo cameras; a foreground extraction unit configured to extract from the depth images, foregrounds with an image coordinate system; a foreground fusion unit configured to fuse the foregrounds in a unified three-dimensional world coordinate system defined by rectangular coordinates of x, y and z directions, where the object stands on a x-z plane limited by the x and z axes; an appearance two-dimensional histogram calculation unit configured to calculate an appearance two-dimensional histogram on the x-z plane from the foreground fused in the three-dimensional world coordinate system by the following steps of dividing the foreground fused in the three-dimensional world coordinate system into vertical members extending along the y direction and getting statistics of the numbers of foreground points in the vertical members so as to obtain the appearance two-dimensional histogram representing the numbers of the foreground points in the vertical members; an overlap number determining unit configured to determine an overlapping region of the corresponding depth images on the x-z plane and determine the number of overlaps, based on the placement of the stereo cameras; a detection parameter determining unit configured to determine a detection parameter relating to a detection position, based on whether the detection position is located in the overlapping region or not and the corresponding number of overlaps; and an object detection unit configured to detect the object by the appearance two-dimensional histogram, based on the determined detection parameter.

According to the method and the apparatus for detecting the object, the effect of the shielding can be eliminated or reduced, and objects can be accurately detected as much as possible.

DETAILED DESCRIPTION OF THE PREFERRED EMBODIMENTS

In the following, embodiments of the present invention are described in detail with reference to the accompanying drawings, so as to facilitate the understanding of the present invention.

The embodiments of the present invention are described in the following order:

1. System Diagram

2. Object Detection Method based on Appearance Two-dimensional Histogram (First Embodiment)

3. Object Detection Method based on Appearance Two-dimensional Histogram and Height Two-dimensional Histogram (Second Embodiment)

4. Object Tracking Method based on Height Two-dimensional Histogram (Third Embodiment)

5. Object Detection Apparatus

6. System Hardware Configuration

7. Summary

<1. System Diagram>

Figure 1:
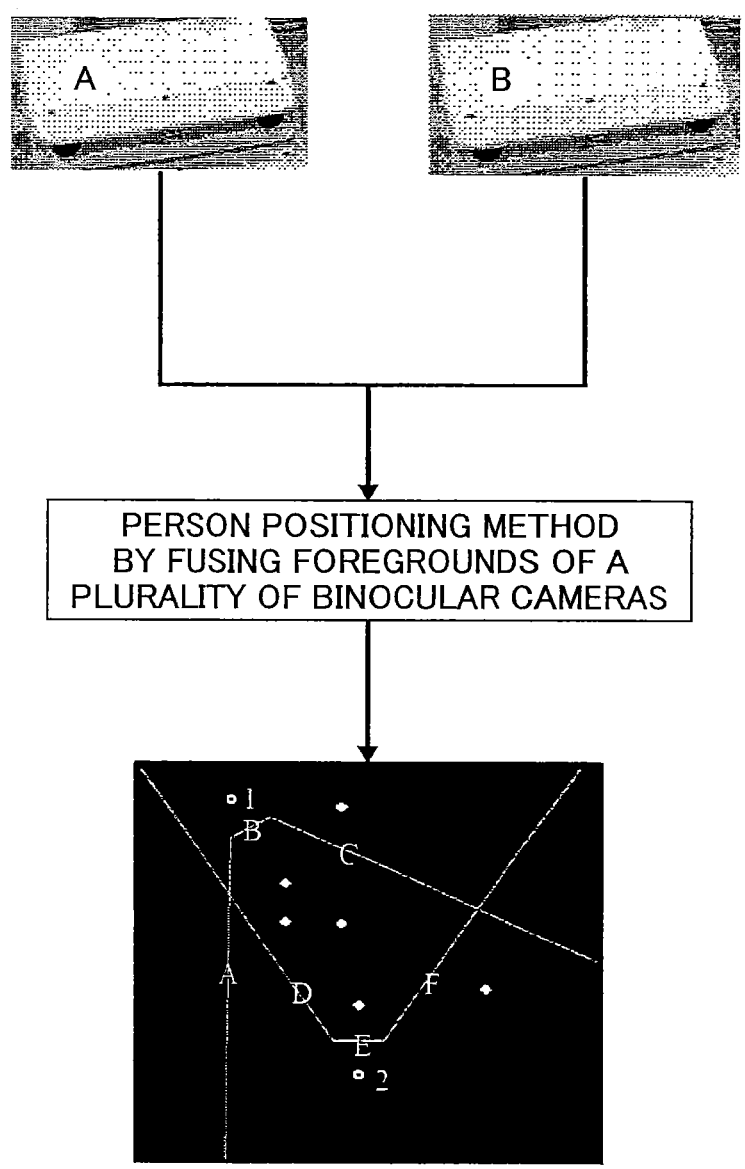
FIG. 1 is a schematic drawing illustrating a system using the method or apparatus according to the embodiment of the present invention.

FIG. 1 is a schematic drawing illustrating a system using the method or apparatus according to the embodiment of the present invention, which mainly illustrates an input and output of the embodiment of the present invention. The input information comes from two binocular cameras. Only two binocular cameras are illustrated in the drawing; however, the present invention may support one, two, or more than two binocular camera(s). The output of the embodiment of the present invention is the positioned person position, which is represented as a bird's-eye view or a top view. The two circles 1 and 2 of FIG. 1 represent the positions of the two binocular cameras in a bird's-eye view; the straight lines A, B and C represent edge of viewing angle of the binocular camera 1; the straight lines D, E and F represent edge of viewing angle of the binocular camera 2; and the white diamonds represent the positioned person.

It should be noted that, in the present example and the example below, the detection target is a person and it is supposed that the person stands on the ground. However, it is just an example, and the present invention is not limited to this examples, the detection target may be any objects, such as an animal or a chair, and the detection object may be placed in any way but is not limited to standing on the ground.

<2. Object Detection Method Based on Appearance Two-Dimensional Histogram (First Embodiment)>

In the following, a whole process of detecting the object by a plurality of stereo cameras according to an embodiment of the present invention is described.

Figure 2:
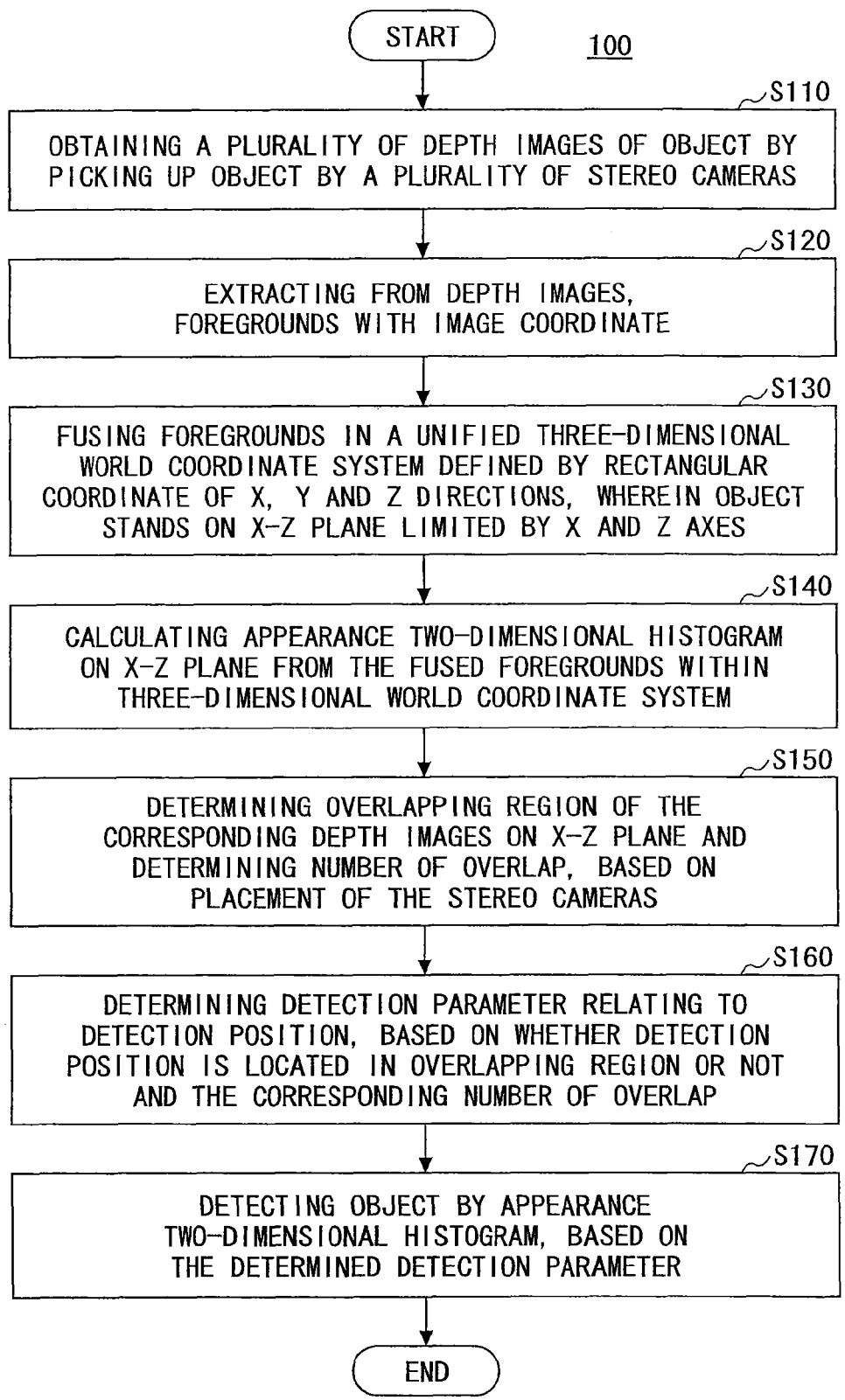
FIG. 2 is an overall flowchart illustrating the method for detecting the object according to an embodiment of the present invention.

FIG. 2 is an overall flowchart illustrating the method for detecting the object 100 according to an embodiment of the present invention.

For convenience of explanation, with regard to the overall flowchart, supposing that a plurality of stereo cameras are placed in a predetermined space, on an object that appears in the predetermined space has stereo imaging performed, and the object is detected by processing the stereo image.

The "predetermined space" may be a room, such as a supermarket or a factory building, may also be an outdoor space, such as a school field or a military field, the predetermined space may be any space as long as it can be a monitoring object. The object for detecting is not limited, and it may be a person, an animal, a flying object, a car or a chair.

The "stereo camera" means a camera that can perform three-dimensional imaging or stereo imaging for the object and can generally output a depth image and a color image (or a gray-scale image) at the same time. As described above, a type of stereo camera helps to generate stereo information by using an active emitted infrared light, such as Kinect of Microsoft, the type of the technology based on the time of flight (TOF) of an infrared light, or the type based on the texture light. Another type of the stereo camera is based on the binocular principle of the stereo stadia, such as a binocular camera or a multi-camera. For convenience of explanation, the binocular camera will be described as an example in the following; however, the present invention is not limited to this example, but may apply any stereo cameras.

It should be noted that three-dimensional information can be obtained accurately by using a stereo camera. Accordingly, the person detection provided in the present invention may be regarded as a detection and a positioning that are completed simultaneously. Of course, it may be that only one of the detection and the positioning of the object is performed.

As illustrated in FIG. 2, in step S110, a plurality of depth images of the object are obtained by picking up the object by a plurality of stereo cameras.

The "stereo camera" means a camera that can perform three-dimensional imaging or stereo imaging for the object and can generally output a depth image and a color image (or a gray-scale image) at the same time. As described above, a type of stereo camera helps to generate stereo information by using an active emitted infrared light, such as Kinect of Microsoft, the type of the technology based on the time of flight (TOF) of an infrared light, or the type based on the texture light. Another type of the stereo camera is based on the binocular principle of the stereo stadia, such as a binocular camera or a multi-camera. For convenience of explanation, the binocular camera will be described as an example in the following; however, the present invention is not limited to this example, but may apply any stereo cameras.

It should be noted that three-dimensional information can be obtained accurately by using a stereo camera. Accordingly, the person detection in provided in the present invention may be regarded as a detection and a positioning that are completed simultaneously. Of course, it may be that only one of the detection and the positioning of the object is performed.

In step S120, foregrounds are extracted from the depth images, and the foregrounds of the depth images have image coordinate systems, respectively.

Extracting the foregrounds from the depth images, namely foreground segmentation, is separating the foregrounds of the stereo images as processing objects from backgrounds and extracting the foregrounds. As an example, the foreground may be segmented by mixed Gaussian dynamic modeling of RGBD. Specifically, it may refer to the article "Plan-view trajectory estimation with dense stereo background model" published by T. Darrel in 2001.

In step S130, the foregrounds are fused in a unified three-dimensional world coordinate system defined by rectangular coordinates of x, y and z directions, where the object stands on a x-z plane limited by the x and z axes.

As an example, in cases where a person standing on the ground is detected, the ground is located on the x-z plane and the direction of the height of the person is y-axis direction.

In the following, an example of foregrounds fusion according to the embodiment of the present invention will be described in detail with reference to FIGS. 3 and 4.

Figure 3:
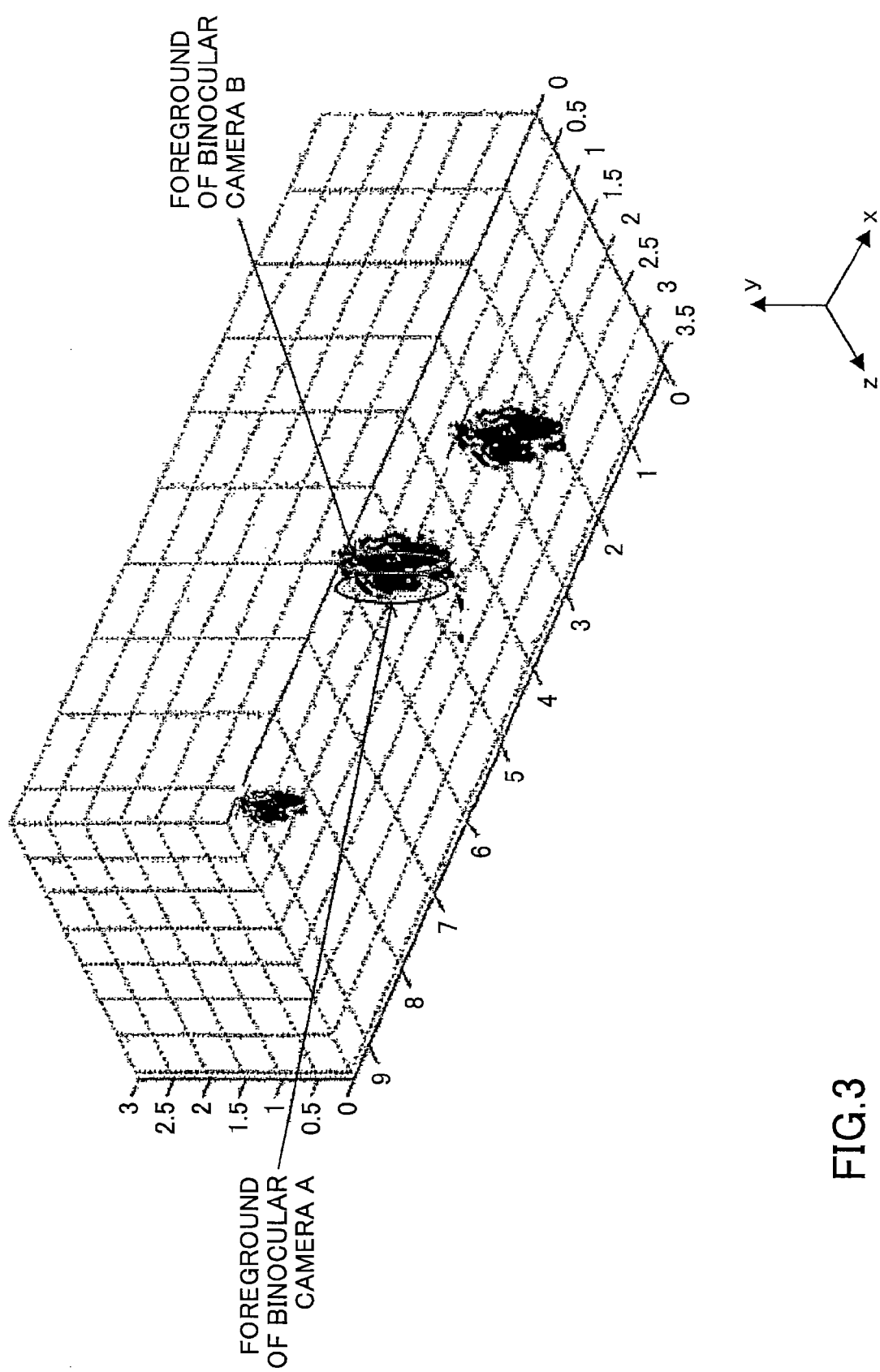
FIG. 3 is a schematic drawing illustrating a fusion of foreground points in a unified x-y-z world coordinate system according to an embodiment of the present invention.

FIG. 3 is a schematic drawing illustrating a fusion of foreground points in a unified x-y-z world coordinate system according to an embodiment of the present invention. As illustrated in FIG. 3, the foreground points of a foreground object at the intermediate position come from different binocular cameras, namely, the foreground points partly come from the binocular camera A and partly come from the binocular camera B. In actuality, foreground objects at other positions in FIG. 3 are the same.

Figure 4:
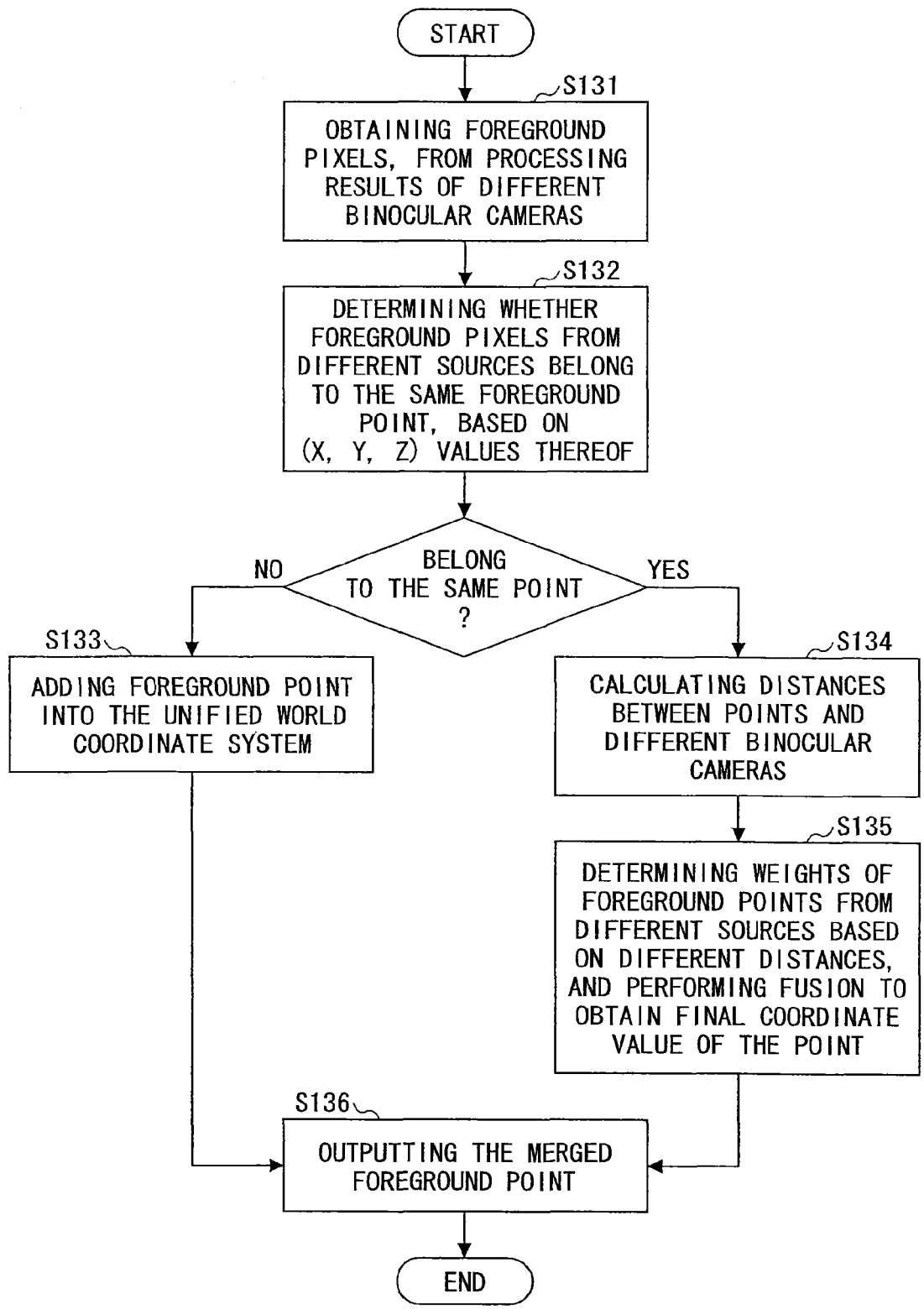
FIG. 4 is a flowchart illustrating an example of a method for fusing the foreground points according to the embodiment of the present invention.

FIG. 4 is a flowchart illustrating an example of a method for fusing the foreground points according to the embodiment of the present invention. The method may be applied to step S130 illustrated in FIG. 2.

The basis for establishing the unified world coordinate system is to determine external parameters of the binocular cameras; the description is omitted here since it is well known technology.

If the unified world coordinate system of the binocular cameras is determined, it is possible to ensure that coordinate values of a point within a physical world are similar in different binocular cameras, namely, the distance between different coordinate points of the point in the unified world coordinate system that are obtained by different binocular cameras is small.

As illustrated in FIG. 4, in step S131, foreground points obtained by different binocular cameras are obtained in the x-y-z unified world coordinate system. The description is omitted here, since the coordinate conversion of the point from the image coordinate system to the world coordinate system is well known technology.

In step S132, it is determined whether the foreground points from the different stereo cameras belong to the same point within the physical world. As an example, the determination may be performed by calculating the distance of these foreground points within the unified world coordinate system that come from different sources; and it may be regarded that the foreground points from the different sources are the same point, if the distance is less than a predetermined threshold; otherwise, it may be regarded that the foreground points from the different sources are not the same point. The threshold may be determined by experiments or obtained by learning. As an example, the threshold is set as 1 cm.

If it is determined that the foreground points from the different sources are not the same point in step S132, it proceeds to step S133. In step S133, the foreground points are set as the foreground point within the unified world coordinate system directly.

If it is determined that the foreground points from the different sources are the same point in step S132, the method proceeds to step S134.

In the example of FIG. 3, it is necessary to perform a fusion of a plurality of points to obtain a coordinate value of a final point, if it is determined that the foreground points from the different sources are the same point.

As an example, the fusion may be performed by using a method of a weighted sum.

Specifically, in step S134, distances between the points and the corresponding sources (the binocular cameras) are calculated.

In step S135, weights of the foreground points from the different sources are calculated (determined) based on the different distance values so that the shorter the distance, the higher the weight. And then, a final coordinate value of the point is obtained by the fusion.

In the following, an example in which foreground points of different sources correspond to the same point within the physical world, is described. It is supposed that a foreground point from a binocular camera A has a coordinate value (xa,ya,za) in an own image coordinate system; the foreground point, that is converted and output to the unified world coordinate system, has a coordinate value (x1,y1,z1), and the distance between the point and the camera A is dist_a. It is supposed that a foreground point from a binocular camera B has a coordinate value (xb,yb,zb) in an own image coordinate system; the foreground point, that is converted and output to the unified world coordinate system, has a coordinate value (x2,y2,z2), and the distance between the point and the camera B is dist_b.

In an example, the weight may be calculated based on the two distances between the point and the cameras A and B, according to the following equation (1).

$$\text{weight\_a} = 1 - \frac{\text{dist\_a}}{(\text{dist\_a} + \text{dist\_b})} \quad (1)$$

$$\text{weight\_b} = 1 - \text{weight\_a}$$

Where weight_a is the weight of the foreground point from the camera A, and weight_b is the weight of the foreground point from the camera B.

The final coordinate value of the fused point (x,y,z) may be calculated by the calculated weight. According to an example, the specific calculation is denoted by the equation (2).

$$(x,y,z)=(x1,y1,z1)*\text{weight\_a}+(x2,y2,z2)*\text{weight\_b} \quad (2)$$

In the above example, the equation (1) for determining the weight based on the distances and the equation (2) of the coordinate fusion are just examples, and other equations may also be applied as necessary as long as the shorter the distance, the higher the weight and the stronger the effect on the final coordinate value.

Furthermore, it should be noted that the fusion of the foreground points from the binocular cameras is described by the example of the foreground points from two binocular cameras; however, it is just an example, and the fusion may also be performed by foreground points from three, four and more binocular cameras.

Returning to FIG. 2, the method proceeds to step S140, after the foreground fusion is completed in step S130.

In step S140, an appearance two-dimensional histogram on the x-z plane is calculated from the foreground fused in the three-dimensional world coordinate system by the following steps of: dividing the foreground fused in the three-dimensional world coordinate system into vertical members extending along the y direction; and getting statistics of the numbers of foreground points in the vertical members, so as to obtain the appearance two-dimensional histogram representing the numbers of the foreground points in the vertical members.

The above appearance two-dimensional histogram and/or the height two-dimensional histogram described below may be regarded as statistical data of a distribution of surface points of an object within a stereo image on a plane view, it is also called an "appearance plan view" in the article "Plan-view trajectory estimation with dense stereo background model" published by T. Darrel in 2001, or an "accumulative top view" or a "height top view" in the patent document CN201210292660.2 for which the inventor is WangXin.

The appearance two-dimensional histogram represents a surface area of a person, and actually is a sum of foreground points within all vertical bins included in the person, in which a larger sum means a larger surface area of the person. The appearance two-dimensional histogram may be used as a basic feature for the subsequent detection of a person, if the appearance two-dimensional histogram is used to represent the surface area of the person.

Figure 5:
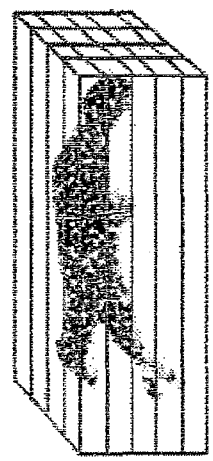
FIG. 5 is a schematic drawing illustrating vertical members in the unified world coordinate system according to the embodiment of the present invention.

The above "vertical member" may also be called as "vertical bin". FIG. 5 is a schematic drawing illustrating vertical bins in the unified world coordinate system according to the embodiment of the present invention. In the unified world coordinate system, a three-dimensional space is segmented by the vertical bins; statistics of number of the foreground points included in each of the vertical bins (in a case of the appearance two-dimensional histogram) or a statistics a maximum value of the foreground points within each of the vertical bins (in a case of the height two-dimensional histogram) is performed; and statistical analysis is performed on a bird's-eye view thereby obtaining the appearance two-dimensional histogram and/or the height two-dimensional histogram.

Figure 6:
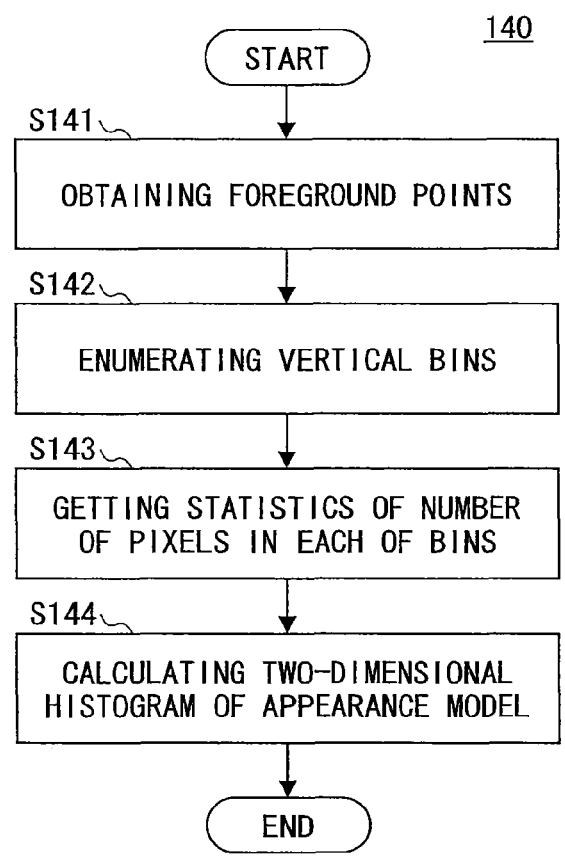
FIG. 6 is a flowchart illustrating the generation of an appearance two-dimensional histogram based on a bird's-eye view according to an embodiment of the present invention.

FIG. 6 is a flowchart illustrating the generation of an appearance two-dimensional histogram based on a bird's-eye view according to an embodiment of the present invention.

In step S141, the foreground points are obtained.

In step S142, vertical bins are enumerated.

In step S143, a statistic of the number of the foreground points within the bins is gotten.

In step S144, the appearance two-dimensional histogram is calculated. The appearance or the appearance model means a surface area of a person, and actually is a sum of foreground points within all vertical bins included in the person, in which a larger sum means a larger surface area of the person. The appearance two-dimensional histogram may be used as a basic feature for the subsequent detection of a person, if the appearance two-dimensional histogram is used to represent the surface area of the person.

Figure 7:
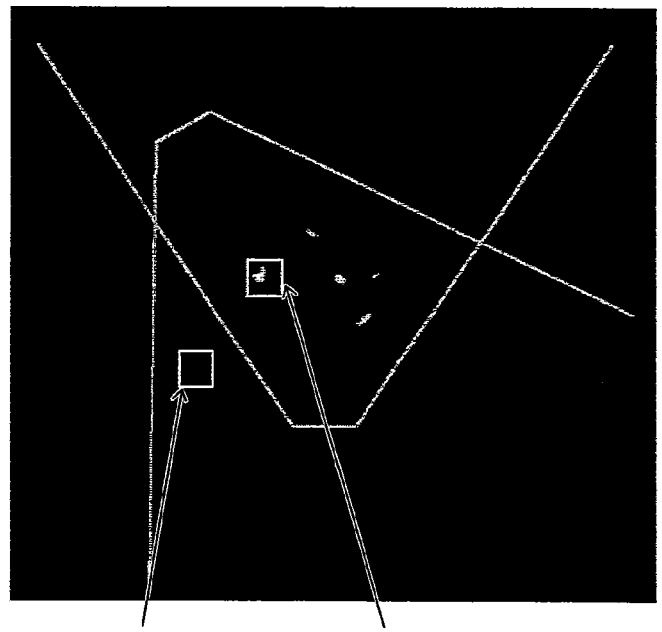
FIG. 7 is a schematic drawing illustrating the appearance two-dimensional histogram.

FIG. 7 is a schematic drawing illustrating the appearance two-dimensional histogram, in which the white spots represent an appearance two-dimensional histogram of persons.

The details of the method for obtaining the appearance two-dimensional histogram (may also be called appearance plane view) may refer to the article "Plan-view trajectory estimation with dense stereo background model" published by T. Darrel in 2001, or the patent document CN201210292660.2 for which the inventor is WangXin, and the entire contents of which are hereby incorporated by reference.

Returning to FIG. 2, the method proceeds to step S150, after the appearance two-dimensional histogram is obtained in step S140.

In step S150, an overlapping region the corresponding depth images on the x-z plane and the number of overlaps are determined, based on the placement of the stereo cameras.

The number of bins within a selected rectangular region in the overlapping region of two binocular cameras, is greater than the number of bins within a selected rectangular region in a non-overlapping region. Meanwhile, in general, the area (the total number of the foreground points) of a selected rectangular region in the overlapping region is greater than the area (the total number of the foreground points) of a selected rectangular region in a non-overlapping region. As an example, in the appearance two-dimensional histogram illustrated in FIG. 7, the intensity of the white spots within the overlapping region is greater than the intensity of the white spots within the non-overlapping region; that is to say, the surface areas of the persons within the overlapping region are greater than the surface areas of the persons within the non-overlapping region.

The appearance model is used in a subsequent detection of the person and it is considered that there is difference between the surface areas of the persons within different overlapping regions; therefore, the part of a detection algorithm needs a corresponding mechanism.

Accordingly, in the present invention, it is considered that the overlapping region of the cameras and the overlap number corresponding to the overlapping region is determined and a detection parameter is adjusted accordingly, so as to detect the object accurately.

Therefore, in step S150, the overlapping region is determined and the overlap number is calculated.

Figure 8:
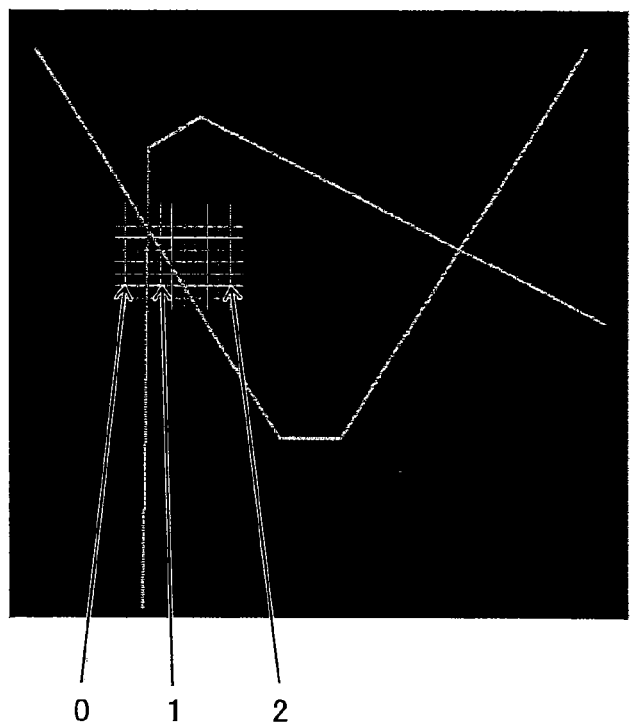
FIG. 8 is a schematic drawing illustrating the calculation of the overlap number of an overlapping region according to an embodiment of the present invention.

FIG. 8 is a schematic drawing illustrating the calculation of the overlap number of an overlapping region according to an embodiment of the present invention.

The distribution of the overlapping region and the number of overlaps are calculated based on the placement of binocular cameras. The overlap number of the region which is covered by only one binocular camera is one, the overlap number of the region which are covered by two binocular camera is two, and so on. It is a well-known technology, which areas within the three-dimensional space is covered by the camera, if internal parameters and placement information of the camera is known, and its description is omitted here. The overlap number may be used as a mask (as illustrated by the grids in FIG. 8) in the appearance two-dimensional histogram or the height two-dimensional histogram described below, after the calculation of the overlap number of the region is completed.

In step S160, a detection parameter relating to a detection position is determined, based on whether the detection position is located in the overlapping region or not and the corresponding number of overlaps.

The detection parameter means a related parameter which is used in the method for detecting the object. The detection parameter varies by a used detection method.

As an example, the detection parameter may be a threshold and an object standard template, if the detection is performed by a method of performing matching between the object standard template and an object to be detected in the appearance two-dimensional histogram. In this case, the object is detected by performing the matching between an object to be detected and the object standard template, determining a matching degree and comparing the matching degree and the threshold.

As another example, the detection parameter may be a specific parameter that depends on a specific object detection model, if the detection is performed by a method of modeling according to the object detection model.

It should be noted that, the detection method and the detection parameter of the present invention are not especially limited, and any detection methods and corresponding detection parameters, such as a method of segmenting and detecting an object based on a connection region analysis, may be used to the present invention. For convenience of the following explanation, as an example, how to adjust the detection parameter will be described by an object detection method of matching the object standard template and the object to be detected in the appearance two-dimensional histogram.

It should be noted that, the object standard template, for example, may be regarded as a feature vector consisting of features for describing a standard object, such as the size of a surface area of the standard object (a single value or a predetermined value range), a height range of the standard object, or a pattern (such as a Gaussian template) of an appearance two-dimensional histogram of the standard object. Specifically, in an example, the standard object template is set as the size of a surface area of the standard object.

In an example of the detection method, a process of detecting the object is performed by the following steps: shifting a matching window with a predetermined shape such as a circle or a rectangle in the appearance two-dimensional histogram, and detecting the object by performing matching between a region within the matching window and the object standard template. For example, in cases where a person is detected, an object surface area within the matching window is calculated, a comparison between the calculated object surface area and the surface area size of the standard object is performed, and it is determined that the detection object, namely a person, exists in the matching window if a difference of the comparison is less than a predetermined threshold, otherwise it is determined that the detection object does not exist.

Here, the detection position is a position where the matching window or a detection window is currently located.

Figure 9:
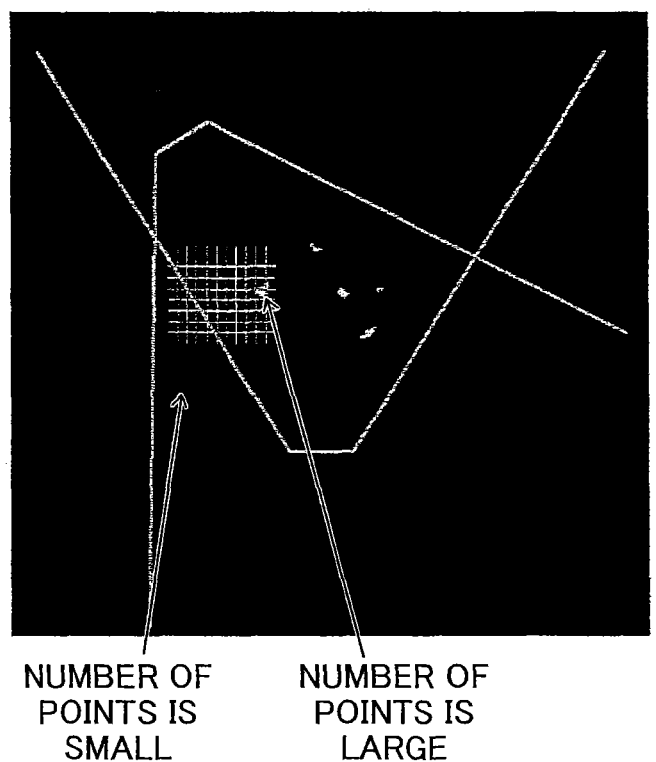
FIG. 9 is a schematic drawing illustrating the determination of object standard surface areas of different overlapping regions as a detection parameter according to the embodiment of the present invention.

FIG. 9 is a schematic drawing illustrating the determination of object standard surface areas of different overlapping regions as a detection parameter according to the embodiment of the present invention. As illustrated in FIG. 9, a large object standard surface area is used for a region with a large number of overlaps by, for example, the mask (overlap number) calculated from FIG. 8; on the other hand, a small object standard surface area is used for a region with a small number of overlaps.

In an example, the detection parameter relating to the detection position is an object standard template of a standard surface area which represents the size of a surface area of a standard object. The detection parameter relating to the detection position is determined based on whether the detection position is located in the overlapping region or not and the corresponding number of overlaps. Specifically, the standard surface area relating to the detection position is calculated based on the number of overlaps of the region where the detection position is located, so that the greater the number of overlaps, the larger the standard surface area.

As described above, the appearance model essentially reflects the surface area of an observed person; therefore, in general, the surface area of a person obtained from a region with a large overlap number of the binocular cameras is greater than the surface areas of a region with a small overlap number and a non-overlapping region. In the detection of a person, it is necessary to use different object templates, namely different object standard surface areas, based on different overlapping regions and overlap numbers, so that the greater the overlap number corresponding to a region, the larger the object standard surface area.

In an example, an object standard surface area is calculated by the equations (3) and (4).

$$Area_i = f(overlap\_value_i) * Std\_Area \quad (3)$$

$$Std\_Area = W\_Avg * H\_Avg * 0.25 \quad (4)$$

Where $Area_i$ represents an object standard surface area corresponding to a detection position i, $Overlap\_value_i$ represents an overlap number corresponding to the detection position i, which has a value of 1, 2, 3, etc., and $f(Overlap\_value_i)$ represents a positive function having a value that increases monotonically with $Overlap\_value_i$ and meets $f(1)=1$. Std_area represents an object standard surface area corresponding to a region where none of the overlaps exist or the overlap number is one; W_avg is an average width of the object, which has a approximate value of 40 cm in cases where the detection object is a person; and H_avg is an average height of the object, which has a approximate value of 170 cm in cases where the detection object is a person. The standard surface area of the object is estimated by one-fourth product of the average width of the object and the average height of the object; because the experience of the estimate for the object surface area is considered in cases where the shielding occurs if the object is obliquely picked up by a single camera.

According to a specific embodiment, the object standard surface area is calculated by the equation (5).

$$Area_i = Sigmoid(overlap\_value_i - 1) * Std\_Area \quad (5)$$

Where sigmoid function is a good threshold function, continuous, smoothly and strictly monotonic. According to an example, its mathematical expression may be denoted by the equation (6):

$$y = g(x) = 2\frac{1}{1+e^{-x}} \quad (6)$$

It should be noted that, the equations (3) to (6) used for the above calculation of the object standard surface area are just examples, the present invention is not limited to those equations, but may be any equations as necessary. For example, as an example, the equation (3) is not limited to $f(1)=1$, but may be other values such as $f(1)=0.5$, and the equation (6) may be adjusted accordingly, for example, the factor of 2 may be removed.

It should be noted that, in above example, the adjusted detection parameter is an object standard surface area; however, it is just an example and the present invention is not limited to this. For example, the adjusted detection parameter may be a threshold, which is used in a determination of a matching degree (or difference degree) between the object template and the object to be detected. Furthermore, the detection parameter may vary with detection methods.

Returning to FIG. 2, the method proceeds to step S170, after the detection parameter is determined in step S160.

In step S170, the object is detected by the appearance two-dimensional histogram, based on the determined detection parameter.

As described above, the detection method is predetermined and the detection parameter relating to the detection method is determined by the operation in step S160; accordingly, the object can be detected from the appearance two-dimensional histogram by the predetermined detection method, based on the determined detection parameter.

According to an embodiment, the determined detection parameter is object standard templates corresponding to detection positions, and specifically, object standard surface areas. In this case, the detection process is as follows: shifting a matching window with a predetermined shape such as a circle or a rectangle in the appearance two-dimensional histogram; determining the detection position where the matching window is located; determining the object standard surface area relating to the detection position; and performing matching between the region within the matching windows and the determined object standard surface area, and more specifically, for example, in cases where a person is detected, calculating the object surface area within the matching window, performing a comparison between the calculated object surface area and the determined object standard surface area (the surface area size of a standard person), and determining that the detection object, namely a person exists in the matching window if a difference of the comparison is less than a predetermined threshold, otherwise determining that a person does not exist.

According to another embodiment, the determined detection parameter is thresholds corresponding to detection positions. In this case, the detection process is as follows: shifting a matching window with a predetermined shape such as a circle or a rectangle in the appearance two-dimensional histogram; determining the detection position where the matching window is located; determining the threshold relating to the detection position, where the object standard template is unified in the whole appearance two-dimensional histogram but the threshold may vary with the detection positions in this case; and performing a match between the region within the matching windows and the object standard template, and more specifically, for example, in cases where a person is detected, calculating the object surface area within the matching window, calculating the absolute value of the difference between the object surface area and the surface area size of a standard person, comparing the absolute value of the difference and the above determined threshold relating to the detection position, and determining that the detection object, namely a person, exists in the matching window if the absolute value of the difference is less than the corresponding threshold, otherwise determining that a person does not exist.

It should be noted that, the detection method and detection parameter described above are just an example, and the present invention is not limited to this; in actuality, all of detection methods and detection parameters thereof, which can perform the object detection by using the appearance two-dimensional histogram according to the embodiment of the present invention, may be applied to the present invention. As an example, in cases where modeling for an object detection model is performed, the detection method is an object detection modeling method and the detection depends on a specific parameter of the object detection model; as another example, in cases where the object is detected by classifying the object by a classifier such as a decision tree or a support vector machine, the detection parameter may be a parameter relating to the classifier, etc.

A position and other information of the detected person can be output after the object such as the person is detected; therefore, the positioning for the person can be realized, and a service can be provided or pushed voluntarily to the person.

The method for detecting the object according to the embodiment of the present invention has at least the following advantages:

(1) the foreground of the image picked up by a plurality of stereo cameras is extracted and fused; therefore, more original information and features are saved as compared with the prior art of fusing result sets, the data amount is remarkably reduced as compared with the prior art of fusing original data sets, namely pixel sets, and the network transmission and processing become easy thereby finding out a good balance among the data saving, the network transmission and the processing overhead; and (2) the detection parameter is determined and/or adjusted based on different overlap numbers of related regions, and the detection is performed based on such detection parameter; therefore, the effect of the shielding can be reduced, the error rate can be reduced, and the detection rate and the positioning accuracy for the object can be improved.

<3. Object Detection Method Based on Appearance Two-Dimensional Histogram and Height Two-Dimensional Histogram (Second Embodiment)>

The object detection performed by the appearance two-dimensional histogram is described above; however, the object detection may also be performed by combining a height two-dimensional histogram, and the meaning and the obtainment method of the height two-dimensional histogram will be described below.

Figure 10:
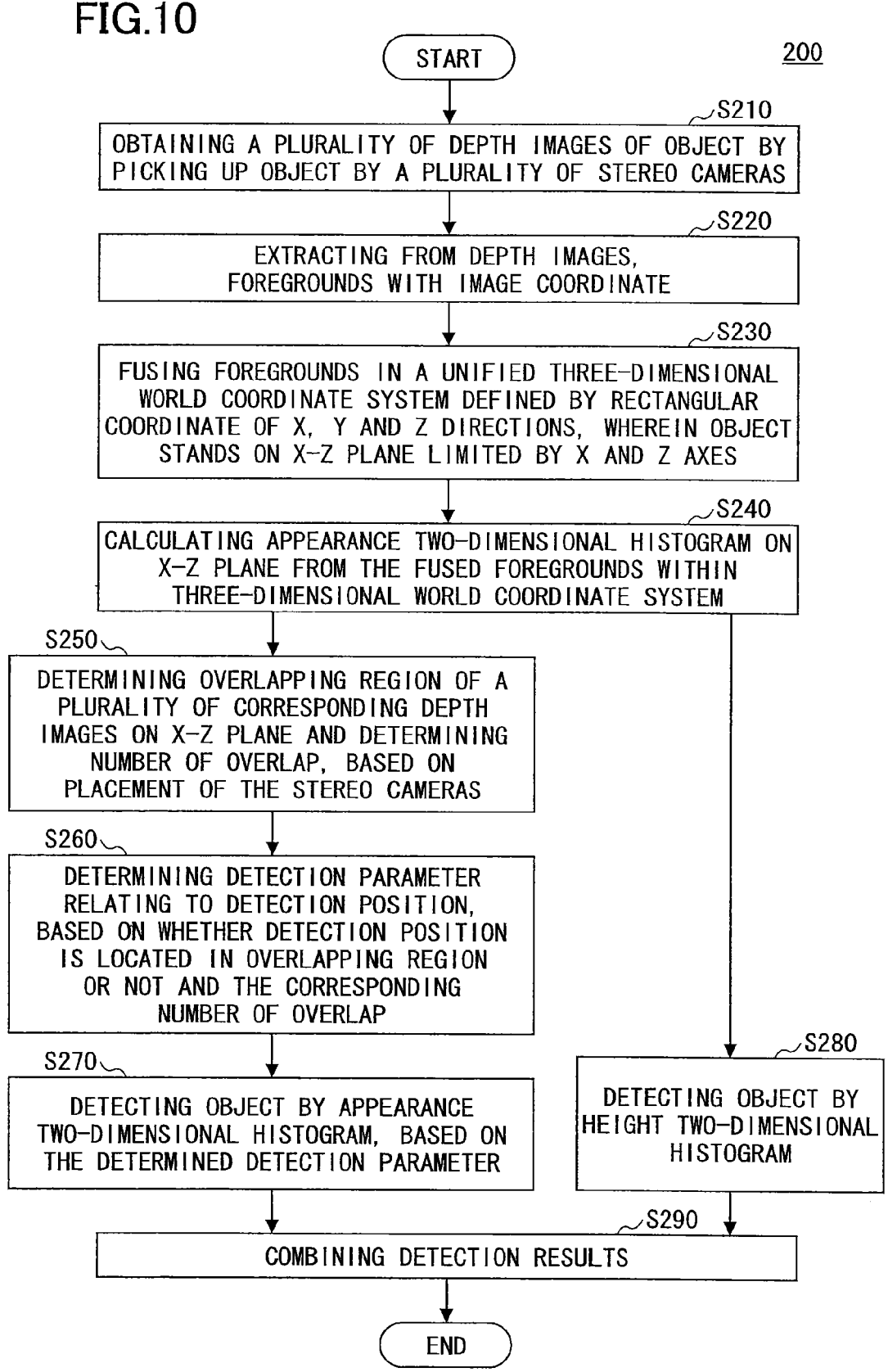
FIG. 10 is an overall flowchart illustrating the method for detecting the object according to the second embodiment of the present invention.

FIG. 10 is an overall flowchart illustrating the method for detecting the object 200 according to the second embodiment of the present invention.

The method for detecting the object 200 according to the second embodiment of the present invention illustrated in FIG. 10, performs the object detection by using both the appearance two-dimensional histogram and the height two-dimensional histogram.

The object detection method of the second embodiment 200 illustrated in FIG. 10, is different from the object detection method of the first embodiment 100 in step S240 and steps S280 and S290 which are added. Other steps S210-S230 and S250-S270 are similar to corresponding steps S110-S130 and S150-S170 in FIG. 2, the applications and functions thereof may refer to the description of the corresponding steps in FIG. 2, and their descriptions are omitted here.

Step S240 is different from step S140 in that besides the appearance two-dimensional histogram, the height two-dimensional histogram is also calculated from the fused foreground.

In cases where the detection object is a person, the height two-dimensional histogram describes a height distribution situation and represents the maximum height within each of the vertical bins.

Figure 11:
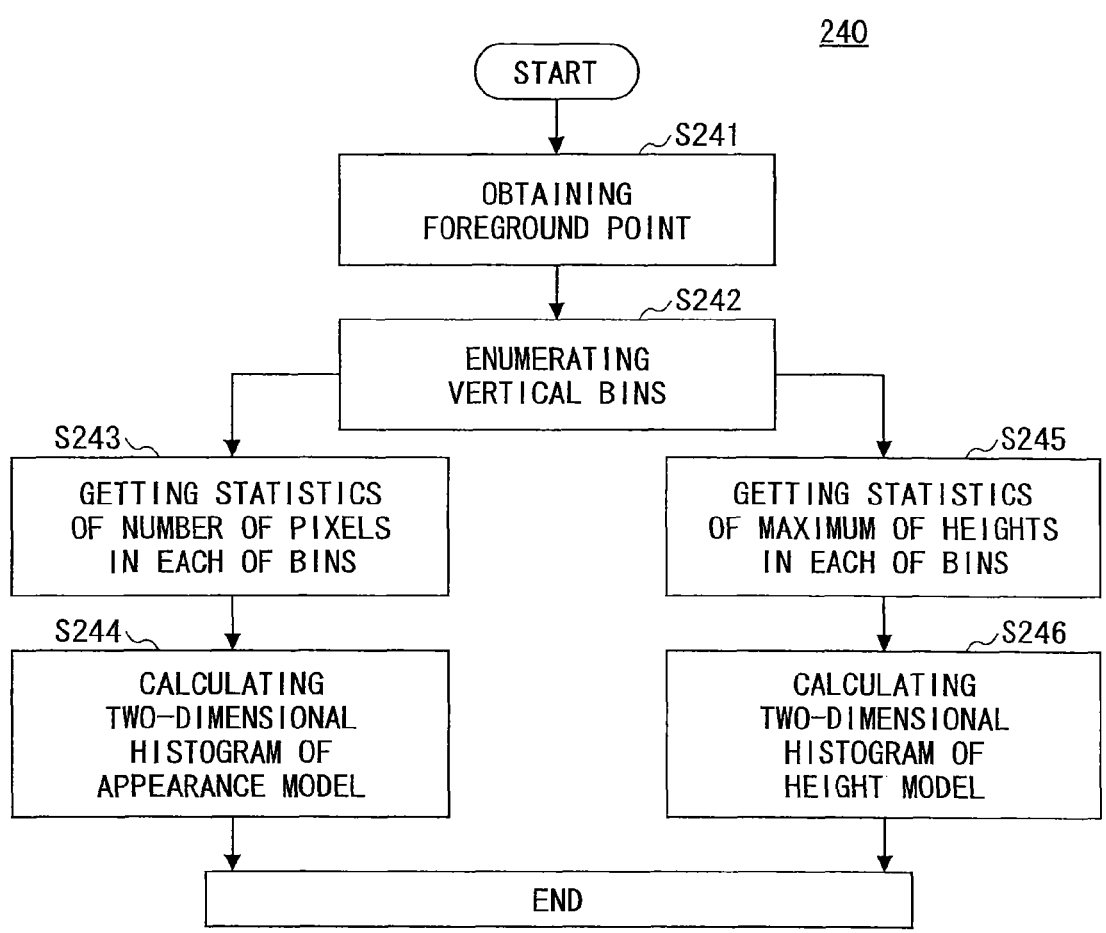
FIG. 11 is a flowchart illustrating methods for calculating an appearance two-dimensional histogram and a height two-dimensional histogram from the fused foreground according to an embodiment of the present invention.

FIG. 11 is a flowchart illustrating methods for calculating an appearance two-dimensional histogram and a height two-dimensional histogram from the fused foreground 240 according to an embodiment of the present invention, and the method 240 may be applied to step S240 in FIG. 10.

The method 240 illustrated in FIG. 11 is different from the method 140 illustrated in FIG. 6 in that steps of calculating the height two-dimensional histogram, namely steps S245 and S246, are added. Other steps are similar to the corresponding steps in FIG. 6, and their descriptions are omitted here.

In step S245, statistics of a maximum value of the foreground points within each of the vertical bins are gotten. In step S246, the height two-dimensional histogram (also called as a height model two-dimensional histogram) is obtained.

Figure 12:
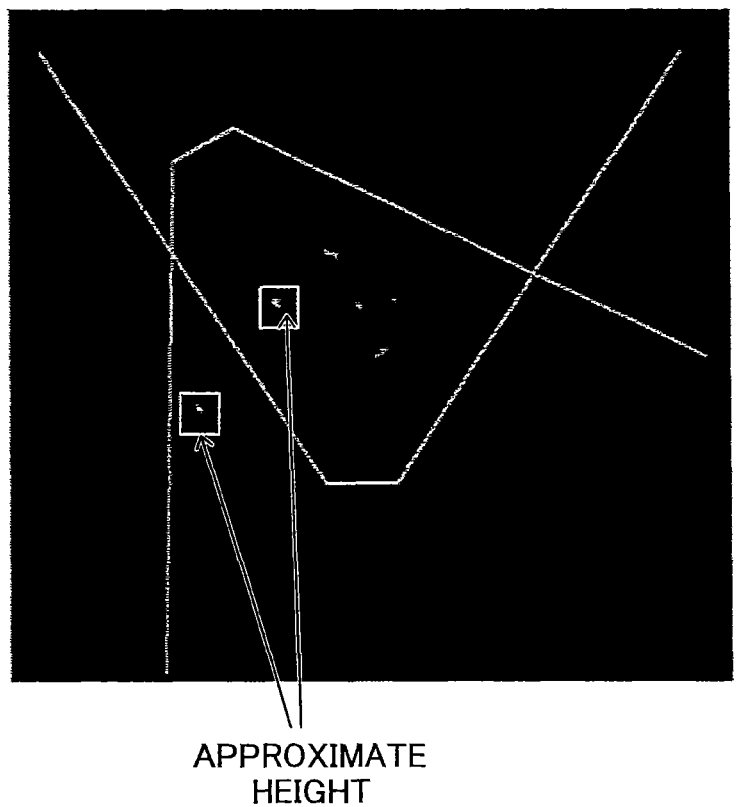
FIG. 12 is a schematic drawing illustrating the height two-dimensional histogram based on a top view according to the embodiment of the present invention.

FIG. 12 is a schematic drawing illustrating the height two-dimensional histogram based on a top view according to the embodiment of the present invention, in which the white spots are the height two-dimensional histograms of persons.

As illustrated in FIG. 10, the maximum values of bins are the same basically in the overlapping region or the non-overlapping region, that is to say, the height distribution of the persons are basically similar.

From FIG. 7 and FIG. 12, two conclusions can be drawn:

(1) the surface area of the person obtained from the overlapping region is greater than the non-overlapping region, since the person can be observed by more binocular cameras in the overlapping region; and (2) the height distribution of the person in the overlapping region is similar to the non-overlapping region, since the height itself of the person in the overlapping region does not change even though the person can be observed by more binocular cameras.

Therefore, it is necessary to adjust the related detection parameter in cases where the object is detected by an appearance two-dimensional histogram; and it is not necessary to adjust the related detection parameter in cases where the object is detected by a height two-dimensional histogram.

Returning to FIG. 10, after step S240, which is similar to FIG. 2, in step S250, the overlap numbers of regions are determined; in step S260, the detection parameters relating to the detection position are determined based on the overlap number of the region in which the detection position is located; and in step S270, the object is detected by the appearance two-dimensional histogram based on the determined detection parameter.

In step S280, the object is detected by the height two-dimensional histogram, wherein the used detection parameter relating to the height two-dimensional histogram during the object detection by the height two-dimensional histogram, is not associated with whether the detection position is located in the overlapping region or not and the number of overlaps.

In an embodiment, as an example of the person detection, an average height within a region to be detected, may be calculated as the height of the region; it is determined whether the height is within a predetermined height range of the person or not, and it is determined that the object to be detected is a person if the height is within the range, otherwise it is determined that the object is not a person.

Of course, the above operation is just an example, and a complex detection method may be used as necessary. As an example, not only is it determined whether an average height is within a predetermined height range or not, but also it is determined whether a standard deviation of the height is within a predetermined height deviation range or not. As another example, the detection may be performed by shape matching; for example, it is determined whether a person exists in the region by performing matching between a pattern of the region to be detected and a standard height two-dimensional histogram pattern of the person.

However, all of the object detections based on the height two-dimensional histogram have a common property: that the detection parameter is not associated with whether the detection position is located in the overlapping region or not and the number of overlaps.

Obviously, the detection result may not be two values of 0 and 1, and alternatively, may be a confidence level (or a probability) for representing the person.

In step S290, the detection results are combined, namely, the object detection result based on the appearance two-dimensional histogram in step S270 and the object detection result based on the height two-dimensional histogram in step S280 are combined, and a final detection result is obtained.

The combination method may vary with the outputs of steps S270 and S280, and may be designed as necessary. For example, if both of the detection results of steps S270 and S280 are confidence levels of the person, a final confidence level may be obtained by combining the two confidence levels after performing a weighting, and it is determined whether it is a person by comparing the final confidence level and a predetermined confidence level threshold.

Alternatively, the detection results may be combined based on a rule, such as a rule that it is determined that a person is detected only if both of the detection results based on the appearance two-dimensional histogram and the height two-dimensional histogram show that it is a person.

Position information and/or other information of the detected person can be output after the person is detected; therefore, the positioning for the person can be realized, and a service can be provided or pushed voluntarily to the person.

According to the object detection method according to the second embodiment of the present invention, the detection accuracy of the object and the positioning accuracy can be further improved.

<4. Object Tracking Method Based on Height Two-Dimensional Histogram <Third Embodiment>

As described above, the height of an object is not affected by the number and the placement of stereo cameras, therefore, an object tracking can be performed by using a height two-dimensional histogram.

Figure 13:
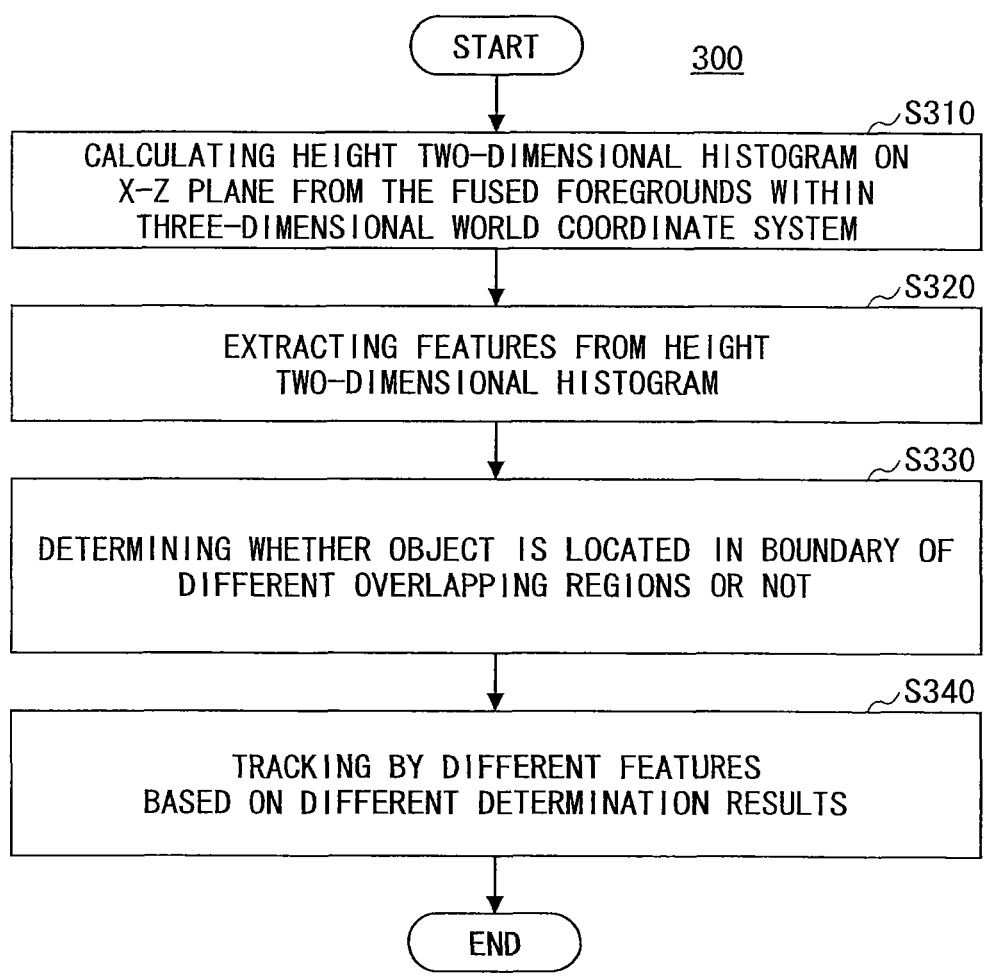
FIG. 13 is a flowchart illustrating a method for tracking the object by using the two-dimensional histogram according to an embodiment of the present invention.

FIG. 13 is a flowchart illustrating a method for tracking the object by using the two-dimensional histogram 300 according to an embodiment of the present invention.

As illustrated in FIG. 13, in step S310, a height two-dimensional histogram on the x-z plane is calculated from the foreground fused in the three-dimensional world coordinate system, by getting statistics of the height of a foreground point with a maximum height within the foreground points in the vertical members so as to obtain the height two-dimensional histogram representing the maximum heights within the vertical members. In this case, it is supposed that a foreground fused in a unified three-dimensional world coordinate system has been obtained, and the obtainment method may refer to steps S110-S130 of FIG. 2. The obtainment method of the height two-dimensional histogram may refer to the right branch in FIG. 11.

Next, the object is tracked by the height two-dimensional histogram.

Specifically, in step S320, features are extracted from the height two-dimensional histogram.

As an example, three types of the feature for tracking are defined. The first feature is a height mask corresponding to the height two-dimensional histogram. Specifically, the height mask corresponding to a point within the height two-dimensional histogram is a first value if the value of the point is greater than a predetermined threshold, otherwise the height mask corresponding to the point is a second value greater than the first value. For example, the first value may be 255, the second value may be 0; and the threshold may be set to, for example, 90 cm as the default value by the experience, or the threshold may also be obtained by the learning. The second feature is an average height representing the value of the average height of candidate objects, such as an average height within a rectangular matching window. The third feature is position information of the candidate objects, such as a center position of the rectangular matching window, namely the coordinates (x,z) in the top view.

In step S330, it is determined whether the object is located in a boundary of the different overlapping regions. For example, the determination whether the object is located in a boundary of the different overlapping regions, may be performed by the variation of the overlap number of a region corresponding to the window during the shift process of the matching window.

In step S340, the object is tracked by different features based on different determination results. The object is tracked based on the second and third features, namely the average height and the position (x,z), if it is determined that the object is located in the boundary of the different overlapping regions. The object is tracked based on the first, second and third features, namely the height mask, the average height and the position (x,z), if it is determined that the object is not located in the boundary of the different overlapping regions.

In this case, the tracking may be implemented by using a common tracking algorithm, such as a Mean Shift algorithm, a Kalman filter or a particle filter. The features for tracking are not a usual color and/or gray histogram or edges, but a height mask, an average height and a position; and the features may be adjusted, if the object is located in the boundaries of different regions.

As an example for explaining how to use features, all of three types of features are used, in cases where the object is located in a non-boundary region. The height mask template of the object is $T_H$, the average height template is $T_{H\_avg}$, the position template of the object is $T_{position}$, and these information items are determined after the tracking of a recent historical frame image. In the current frame, the measured height mask of the object is denoted by $H_{mask}$, the average height of the object is $H_{avg}$, and the position of the object is $P_{x,z}$. It is determined whether the measured object and the result of the historical frame are matched or not according to the equation (7), and it is determined that the tracking is successful if they are matched.

$$M_{value} = \alpha * SAD(T_H, H_{mask}) + \beta * SAD(T_{H\_avg}, H_{avg}) + \gamma * SAD(T_{position}, P_{x,z}) \quad (7)$$

Where, $M_{value}$ is a matching value obtained by the calculation, and it may be regarded that the tracking is successful if $M_{value}$ is less than a predetermined threshold; $\alpha$, $\beta$ and $\gamma$ are the weights of the above three features which can be determined by experiments, and the default values of them are 1.0, 0.7, 9.0, respectively; SAD, the Sum of Absolute Difference, namely the sum of absolute differences; and for the detailed description thereof one may refer to http://en.wikipedia.org/wiki/Sum_of_absolute_differences.

Similarly, the equation (7) may be easily modified, for example, by removing the height mask, to perform the tracking by using two features in the boundary region.

Figure 14:
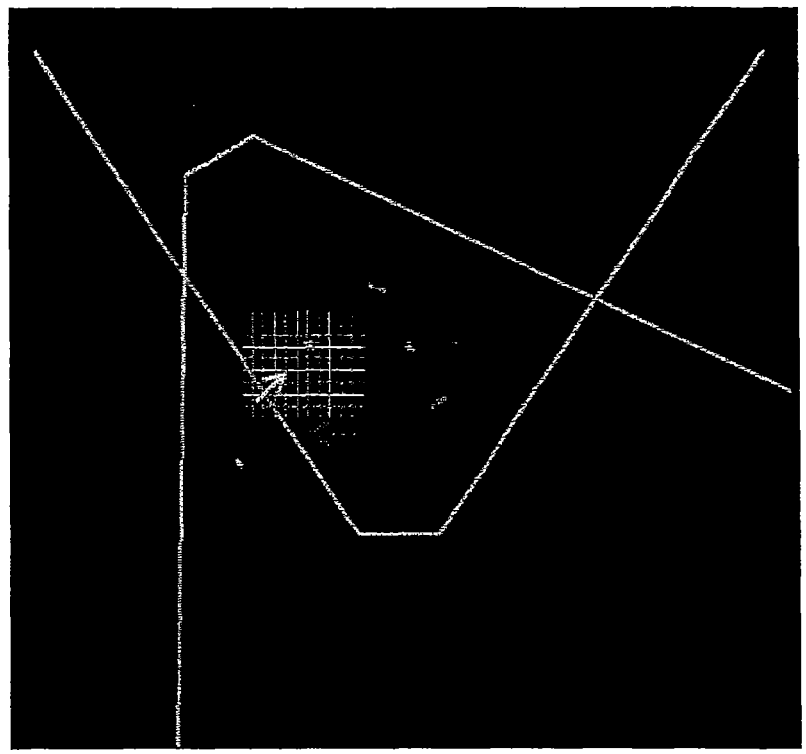
FIG. 14 is a schematic drawing illustrating a tracking feature based on the overlap number of the overlapping region according to the embodiment of the present invention.

FIG. 14 is a schematic drawing illustrating a tracking feature based on the overlap number of the overlapping region according to the embodiment of the present invention. The grids show the height mask, the arrow 1 shows the shift of a person is extending over the boundary of the overlapping region from a region with a small overlap number to a region with a large overlap number, and the arrow 2 shows the shift of a person is extending over the boundary of the overlapping region from a region with a large overlap number to a region with a small overlap number.

The tracking result, such as the tracked person and position information may be output by any ways.

Furthermore, the inventor found that in the whole tracking process, the changes of the average height feature and the position feature are gradual processes, wherever the person is located. However, the height mask significantly changes at the boundary of the overlapping region. Specifically, the range of the height mask becomes larger if a person shifts to a region with a large overlap number, and the range of the height mask becomes smaller if a person shifts to a region with a small overlap number.

Accordingly, it is considered that the change trend of the height mask may be used for the object tracking.

In an embodiment, in the process of the tracking based on the appearance two-dimensional histogram, it is determined whether a change trend of the height mask matches a desired change trend of the height mask, if it is determined that the object is located in the boundary of the different overlapping regions. Furthermore, it is determined that the tracking at this time failed, if it is determined that the change trend of the height mask does not match the desired change trend of the height mask. In an embodiment, the desired change trend of the height mask may be that: a range of the height mask becomes larger if the object enters a region with a greater number of overlap through the boundary, and a range of the height mask becomes smaller if the object enters a region with a less number of overlap through the boundary.

<5. Object Detection Apparatus>

Figure 15:
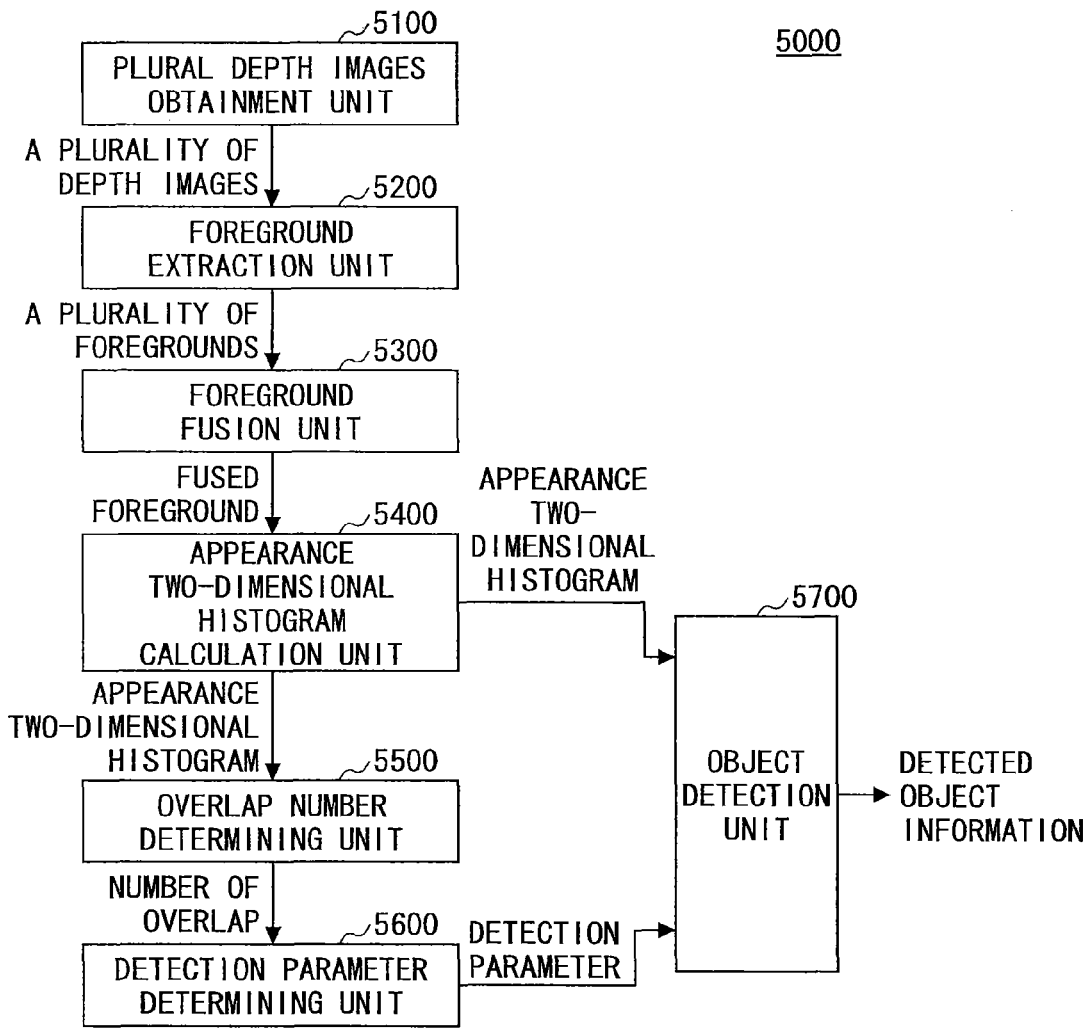
FIG. 15 is a block diagram illustrating the function configuration of the apparatus for detecting the object according to an embodiment of the present invention.

FIG. 15 is a block diagram illustrating the function configuration of the apparatus for detecting the object 5000 according to an embodiment of the present invention.

The object detection apparatus 5000 is used to process the image obtained by a plurality of stereo cameras, which are placed in a predetermined space, and detects and/or tracks the object.

As illustrated in FIG. 15, the object detection apparatus 5000 comprise a plural depth images obtainment unit 5100 configured to obtain a plurality of depth images of the object by picking up the object by a plurality of stereo cameras; a foreground extraction unit 5200 configured to extract from the depth images, foregrounds with an image coordinate system; a foreground fusion unit 5300 configured to fuse the foregrounds in a unified three-dimensional world coordinate system defined by a rectangular coordinate of x, y and z directions, where the object stands on a x-z plane limited by the x and z axes; an appearance two-dimensional histogram calculation unit 5400 configured to calculate an appearance two-dimensional histogram on the x-z plane from the foreground fused in the three-dimensional world coordinate system by the following steps of dividing the foreground fused in the three-dimensional world coordinate system into vertical members extending along the y direction and getting statistics of the numbers of foreground points in the vertical members so as to obtain the appearance two-dimensional histogram representing the numbers of the foreground points in the vertical members; an overlap number determining unit 5500 configured to determine an overlapping region of the corresponding depth images on the x-z plane and determine the number of overlaps, based on the placement of the stereo cameras; a detection parameter determining unit 5600 configured to determine a detection parameter relating to a detection position, based on whether the detection position is located in the overlapping region or not and the corresponding number of overlaps; and an object detection unit 5700 configured to detect the object by the appearance two-dimensional histogram, based on the determined detection parameter.

The operations of the above functional units 5100 to 5700 of the object detection apparatus 5000 may refer to the flowchart illustrated in FIG. 2 and the related description, and the descriptions of them are omitted here.

<6. System Hardware Configuration>

Figure 16:
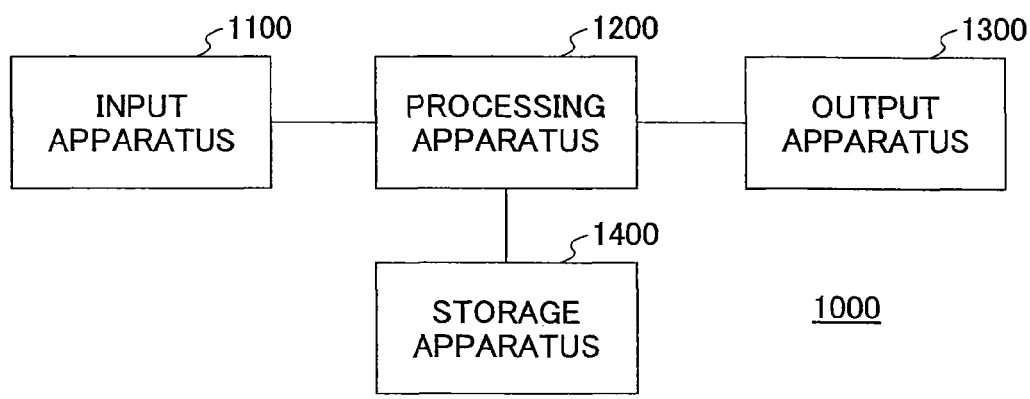
FIG. 16 is an overall hardware block diagram of a system for detecting the object according to the embodiment of the present invention.

The present invention may also be implemented as a hardware system for detecting (tracking) an object. FIG. 16 is an overall hardware block diagram of a system for detecting (tracking) the object 1000 according to the embodiment of the present invention. As illustrated in FIG. 16, the object detection system 1000 may comprise an input apparatus 1100 for inputting related images and information from the outside such as images or video streams picked up by a plurality of stereo cameras, the size of a predetermined space, internal parameters and external parameters such as positions of the cameras, for example, including a keyboard, a mouse, a communication network and a remote input device connected thereto, etc.; a processing apparatus 1200 for implementing the above object detection method according to the embodiments of the present invention, or being implemented as the above object detection apparatus according to the embodiments of the present invention, such as CPU of a computer or other chips having processing ability, etc., that can be connected to a network (not shown) such as the Internet and obtain data such as the left and right images from the network based on the requirement of processing; an output apparatus 1300 for outputting the result obtained by implementing the above object detection (tracking) procedure to the outside, such as a screen, a printer, a communication network and a remote output device connected thereto, etc.; and a storage apparatus 1400 for storing data such as a stereo image, a space size, parameters of the cameras, an appearance two-dimensional histogram, a height two-dimensional histogram, an object standard template and thresholds, which are related to the above detection process of the object, etc., by a volatile method or a nonvolatile method, such as various kinds of volatile or nonvolatile memory including a random-access memory (RAM), a read-only memory (ROM), a hard disk and a semiconductor memory.

<7. Summary>

According to an embodiment of the present invention, a method for detecting an object may comprise the steps of obtaining a plurality of depth images of the object by picking up the object by a plurality of stereo cameras; extracting from the depth images, foregrounds with an image coordinate system; fusing the foregrounds in a unified three-dimensional world coordinate system defined by rectangular coordinates of x, y and z directions, where the object stands on a x-z plane limited by the x and z axes; calculating an appearance two-dimensional histogram on the x-z plane from the foreground fused in the three-dimensional world coordinate system by the following steps of dividing the foreground fused in the three-dimensional world coordinate system into vertical members extending along the y direction and getting statistics of the numbers of foreground points in the vertical members so as to obtain the appearance two-dimensional histogram representing the numbers of the foreground points in the vertical members; determining an overlapping region of the corresponding depth images on the x-z plane and determining the number of overlaps, based on the placement of the stereo cameras; determining a detection parameter relating to a detection position, based on whether the detection position is located in the overlapping region or not and the corresponding number of overlaps; and detecting the object by the appearance two-dimensional histogram, based on the determined detection parameter.

According to another embodiment of the present invention, an apparatus for detecting an object may comprise a plural depth images obtainment unit configured to obtain a plurality of depth images of the object by picking up the object by a plurality of stereo cameras; a foreground extraction unit configured to extract from the depth images, foregrounds with an image coordinate system; a foreground fusion unit configured to fuse the foregrounds in a unified three-dimensional world coordinate system defined by a rectangular coordinate of x, y and z directions, where the object stands on a x-z plane limited by the x and z axes; an appearance two-dimensional histogram calculation unit configured to calculate an appearance two-dimensional histogram on the x-z plane from the foreground fused in the three-dimensional world coordinate system by the following steps of dividing the foreground fused in the three-dimensional world coordinate system into vertical members extending along the y direction and getting statistics of the numbers of foreground points in the vertical members so as to obtain the appearance two-dimensional histogram representing the numbers of the foreground points in the vertical members; an overlap number determining unit configured to determine an overlapping region of the corresponding depth images on the x-z plane and determine the number of overlaps, based on the placement of the stereo cameras; a detection parameter determining unit configured to determine a detection parameter relating to a detection position, based on whether the detection position is located in the overlapping region or not and the corresponding number of overlaps; and an object detection unit configured to detect the object by the appearance two-dimensional histogram, based on the determined detection parameter.

According to the method and apparatus for detecting the object according to the embodiment of the invention, the effect of the shielding can be reduced or eliminated, and more objects can be detected accurately.

The above description is just for explaining, and may be modified and/or replaced.

As the examples described above, the stereo cameras are binocular cameras; however, the present invention is not limited to these examples, but may apply any stereo camera.

As the examples described above, the detection object is a person. However, the present invention is not limited to these examples, the detection object may be any object, such as an animal or a chair.

As the examples described above, the person stands on the ground; however, the present is not limited these examples, the detection object may be placed in any way, but does not stand on the ground.

As the examples described above, the processing object is an appearance two-dimensional histogram in a top view; however, the present invention is not limited to these examples, the processing object may be an appearance two-dimensional histogram in any direction, such as an appearance two-dimensional histogram in a side view. The processing object is not limited to an appearance two-dimensional histogram, but may also be a height two-dimensional histogram, etc.

As the examples described above, the term of the "depth image" may be understood in a broad sense, and may apply any image having distance information, which can be applied to the present invention, such as a disparity map.

The basic principle of the present invention is described above with reference to the embodiments. Any one or all of the steps or units of the method or apparatus according to the present invention may be implemented by hardware, software or their combination in any one of computing devices (including a processor, a storage medium, etc.) or a network of computing devices, and it can be implemented by persons skilled in the art who have read the specification of the present application.

Therefore, the present invention may also be realized by a program or a set of programs running on any one of computing devices. The computing devices may be well known general-purpose devices. Therefore, the present invention may also be implemented by providing a program product including program codes for implementing the method or apparatus. That is to say, the program product also belongs to the present invention, and a storage medium storing the program product also belongs to the present invention. Obviously, the storage medium may be any one of well-known storage media or storage media which are to be developed.

In addition, in the apparatus or method of the present invention, units or steps may be divided and/or recombined. The division and/or recombination should be regarded as an equivalent embodiment of the present invention. For example, step S240 illustrated in FIG. 10 may be divided into an obtainment of the appearance two-dimensional histogram and an obtainment of the height two-dimensional histogram. Steps of the above method may be performed in time order, however the performing sequence is not limited to the time order. Any steps may be performed in parallel or independently. For example, the object detection based on the appearance two-dimensional histogram and the object detection based on the height two-dimensional histogram illustrated in FIG. 10 may be performed in any order.

The above descriptions of the embodiments are just examples, and various modifications, replacements or combinations may be made without departing from the scope of the present invention by persons skilled in the art.

The present application is based on and claims the benefit of priority of Chinese Priority Application No. 201210574632.X filed on Dec. 26, 2012, the entire contents of which are hereby incorporated by reference.

What is claimed is:

1. A method for detecting an object, comprising:
obtaining a plurality of depth images of the object by picking up the object by a plurality of stereo cameras;
extracting from the depth images, foregrounds with an image coordinate system;
fusing the foregrounds in a unified three-dimensional world coordinate system defined by rectangular coordinates of x, y and z directions, where the object stands on an x-z plane limited by x and z axes, to generate a foreground fused in the unified three-dimensional world coordinate system;
calculating an appearance two-dimensional histogram on the x-z plane of the foreground fused in the three-dimensional world coordinate system by
dividing the foreground fused in the three-dimensional world coordinate system into vertical members extending along the y direction and corresponding to objects on the x-z plane, and
getting statistics of numbers of foreground points associated with at least one of the vertical members so as to obtain the appearance two-dimensional histogram representing the numbers of the foreground points associated with at least one of the vertical members;
for at least one of the vertical members, determining whether a detection position of the vertical member within the foreground fused in the three-dimensional world coordinate system is within an overlapping region of fields of view of the stereo cameras and determining a number of stereo cameras capturing the overlapping region, based on placements of the stereo cameras;

determining a detection parameter relating to the detection position of the at least one of the vertical members, wherein the determined detection parameter is an object template corresponding to an object standard surface area at the detection position, the object standard surface area being a function of an overlap number and a region where none of overlaps exists; and detecting the object as the at least one of the vertical members, based on a comparison operation using the determined detection parameter.

2. The method for detecting an object according to claim 1,
wherein the detection parameter determined in the determining the detection parameter is a matching threshold and the object template,
wherein the object is detected by performing a matching between an object to be detected and the object template, determining a matching degree and comparing the matching degree and the matching threshold.

3. The method for detecting an object according to claim 1, further comprising:
calculating a height two-dimensional histogram on the x-z plane from the foreground fused in the three-dimensional world coordinate system, by getting statistics of the height of a foreground point with a maximum height within the foreground points in the vertical members so as to obtain the height two-dimensional histogram representing the maximum heights within the vertical members; and
tracking the object by the height two-dimensional histogram, which comprises
extracting features from the height two-dimensional histogram,
determining whether the object is located in a boundary of different overlapping regions, and
tracking the object by different features based on different determination results.

4. The method for detecting an object according to claim 3, further comprising:
defining three types of the different features for tracking, wherein a first feature is a height mask corresponding to the height two-dimensional histogram, in which the height mask corresponding to a point within the height two-dimensional histogram is a first value if the first value of the point is greater than a predetermined threshold, otherwise the height mask corresponding to the point is a second value greater than the first value; a second feature is an average height representing a value of the average height of candidate objects; and a third feature is position information of the candidate objects,
wherein tracking the object by different features based on different determination results, comprises
tracking the object based on the second and third features, if the object is determined to be located in the boundary of the different overlapping regions; and
tracking the object based on the first, second and third features, if the object is not determined to be located in the boundary of the different overlapping regions.

5. The method for detecting an object according to claim 4, further comprising:
determining whether a change trend of the height mask matches a desired change trend of the height mask, if it is determined that the object is located in the boundary of the different overlapping regions; and
determining that the tracking failed, if it is determined that the change trend of the height mask does not match the desired change trend of the height mask.

6. The method for detecting an object cording to claim 5, wherein the desired change trend of the height mask is where a range of the height mask becomes larger if the object enters a region with a greater number of overlaps through the boundary, and the range of the height mask becomes smaller if the object enters a region with a lesser number of overlaps through the boundary.

7. The method for detecting an object according to claim 1,
wherein the detection parameter relating to the detection position is an object template of a standard surface area which represents a size of a surface area of a standard object,
wherein the determining the detection parameter relating to the detection position based on whether the detection position is located in the overlapping region or not and the corresponding number of stereo cameras capturing the overlapping region, comprises
calculating the standard surface area relating to the detection position based on the number of stereo cameras capturing the overlapping region where the detection position is located so that the greater the number of stereo cameras capturing the overlapping region, the larger is the standard surface area.

8. The method for detecting an object according to claim 1, further comprising:
calculating a height two-dimensional histogram on the x-z plane from the foreground fused in the three-dimensional world coordinate system, by getting statistics of the height of a foreground point with a maximum height within the foreground points in the vertical members so as to obtain the height two-dimensional histogram representing the maximum heights within the vertical members; and
detecting the object by the height two-dimensional histogram, wherein a detection parameter relating to the height two-dimensional histogram during the object detection by the height two-dimensional histogram, is not associated with whether the detection position is located in the overlapping region or the number of stereo cameras capturing the overlapping region.

9. The method for detecting an object according to claim 1,
wherein the fusing the foregrounds in the unified three-dimensional world coordinate system defined by the rectangular coordinates of x, y and z directions, comprises:
determining whether the foreground points from the stereo cameras belong to a same point within a physical world;
setting the foreground points within the unified three-dimensional world coordinate system directly, if it is determined that the foreground points from the stereo cameras are not the same point; and
obtaining a coordinate value of the same point within the unified three-dimensional world coordinate system by calculating a weighted sum of the coordinate values of the foreground points from the stereo cameras, if it is determined that the foreground points from the stereo cameras are the same point, wherein weights of the coordinate values of the foreground points from the stereo cameras are determined based on distances between the foreground points and the corresponding stereo cameras so that the shorter the distance, the higher is the weight.

10. An apparatus for detecting an object, comprising: circuitry configured to
obtain a plurality of depth images of the object by picking up the object by a plurality of stereo cameras;
extract from the depth images, foregrounds with an image coordinate system;
fuse the foregrounds in a unified three-dimensional world coordinate system defined by rectangular coordinates of x, y and z directions, where the object stands on x-z plane limited by x and z axes, to generate a foreground fused in the unified three-dimensional world coordinate system;
calculate an appearance two-dimensional histogram on the x-z plane of the foreground fused in the three-dimensional world coordinate system by
dividing the foreground fused in the three-dimensional world coordinate system into vertical members extending along the y direction and corresponding to objects on the x-z plane, and
getting statistics of numbers of foreground points associated with at least one of the vertical members on as to obtain the appearance two-dimensional histogram representing the numbers of the foreground points associated with at least one of the vertical members;
for at least one of the vertical members, determine whether a detection position of the vertical member within the foreground fused in the three-dimensional world coordinate system is within an overlapping region of fields of view of the stereo cameras and determine a number of stereo cameras capturing the overlapping region, based on placements of the stereo cameras;
determine a detection parameter relating to the detection position of the at least one of the vertical members, wherein the determined detection parameter is an object template corresponding to an object standard surface area at the detection position, the object standard surface area being a function of an overlap number and a region where none of overlaps exists; and
detect the object as the at least one of the vertical members, based on a comparison operation using the determined detection parameter.

11. The apparatus for detecting an object according to claim 10,
wherein the determined detection parameter is a matching threshold and the object template,
wherein the object is detected by performing a matching between an object to be detected and the object template, determining a matching degree and comparing the matching degree and the matching threshold.

12. The apparatus for detecting an object according to claim 10, wherein the circuitry is further configured to
calculate a height two-dimensional histogram on the x-z plane from the foreground fused in the three-dimensional world coordinate system, by getting statistics of the height of a foreground point with a maximum height within the foreground points in the vertical members so as to obtain the height two-dimensional histogram representing the maximum heights within the vertical members; and
track the object by the height two-dimensional histogram, which comprises
extracting features from the height two-dimensional histogram,
determining whether the object is located in a boundary of different overlapping regions, and
tracking the object by different features based on different determination results.

13. The apparatus for detecting an object according to claim 12,
wherein three types of the different features for tracking are defined, wherein a first feature is a height mask corresponding to the height two-dimensional histogram, in which the height mask corresponding to a point within the height two-dimensional histogram is a first value if the first value of the point is greater than a predetermined threshold, otherwise the height mask corresponding to the point is a second value greater than the first value; a second feature is an average height representing a value of the average height of candidate objects; and a third feature is position information of the candidate objects,
wherein the circuitry is further configured to
track the object based on the second and third features, if the object is determined to be located in the boundary of the different overlapping regions; and
track the object based on the first, second and third features, if the object is determined to be not located in the boundary of the different overlapping regions.

14. The apparatus for detecting an object according to claim 13, wherein the circuitry is further configured to
determine whether a change trend of the height mask matches a desired Change trend of the height mask, if it is determined that the object is located in the boundary of the different overlapping regions; and
determine that the tracking failed, if it is determined that the change trend of the height mask does not match the desired change trend of the height mask.

15. The apparatus for detecting an object according to claim 14,
wherein the desired change trend of the height mask is where a range of the height mask becomes larger if the object enters a region with a greater number of overlaps through the boundary, and the range of the height mask becomes smaller if the object enters a region with a lesser number of overlaps through the boundary.

16. The apparatus for detecting an object according to claim 10,
wherein the detection parameter relating to the detection position is an object template of a standard surface area which represents a size of a surface area of a standard object,
wherein the circuitry is further configured to calculate the standard surface area relating to the detection position based on the number of stereo cameras capturing the overlapping region where the detection position is located so that the greater the number of stereo cameras capturing the overlapping region, the larger is the standard surface area.

17. The apparatus for detecting an object according to claim 10, wherein the circuitry is further configured to
calculate a height two-dimensional histogram on the x-z plane from the foreground fused in the three-dimensional world coordinate system, by getting statistics of the height of a foreground point with a maximum height within the foreground points in the vertical members so as to obtain the height two-dimensional histogram representing the maximum heights within the vertical members; and detect the object by the height two-dimensional histogram, wherein a detection parameter relating to the height two-dimensional histogram during the object detection by the height two-dimensional histogram, is not associated with whether the detection position is located in the overlapping region or the number of stereo cameras capturing the overlapping region.

18. The apparatus for detecting an object according to claim 10, wherein the circuitry is further configured to determine whether the foreground points from the stereo cameras belong to a same point within a physical world;

set the foreground points within the unified three-dimensional world coordinate system directly, if it is determined that the foreground points from the stereo cameras are not the same point; and obtain a coordinate value of the same point within the unified three-dimensional world coordinate system by calculating a weighted sum of the coordinate values of the foreground points from the stereo cameras, if it is determined that the foreground points from the stereo cameras are the same point, wherein weights of the coordinate values of the foreground points from the stereo cameras are determined based on distances between the foreground points and the corresponding stereo cameras so that the shorter the distance, the higher is the weight.

* * * * *